(12) United States Patent
Prakash et al.

(10) Patent No.: US 12,464,147 B1
(45) Date of Patent: Nov. 4, 2025

(54) TECHNIQUES FOR AVOIDING RE-ENCODING OF MEDIA CONTENT ITEMS

(71) Applicant: NETFLIX, INC., Los Gatos, CA (US)

(72) Inventors: Adithya Prakash, Campbell, CA (US); Aditya Mavlankar, San Francisco, CA (US); Liwei Guo, San Francisco, CA (US); Anush Moorthy, Redwood City, CA (US); Kyle Christopher Swanson, Los Gatos, CA (US); Li-Heng Chen, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/656,512

(22) Filed: May 6, 2024

(51) Int. Cl.
*H04N 19/00* (2014.01)
*G11B 27/031* (2006.01)
*H04N 19/40* (2014.01)

(52) U.S. Cl.
CPC ........... *H04N 19/40* (2014.11); *G11B 27/031* (2013.01)

(58) Field of Classification Search
CPC ..................................... H04N 19/00
See application file for complete search history.

(56) References Cited

U.S. PATENT DOCUMENTS

| | | | |
|---|---|---|---|
| 10,911,791 B2 | 2/2021 | Katsavounidis | |
| 2003/0095790 A1 | 5/2003 | Joshi | |
| 2004/0156623 A1 | 8/2004 | Kato et al. | |
| 2007/0027949 A1 | 2/2007 | Park et al. | |
| 2013/0282877 A1 | 10/2013 | Keum et al. | |
| 2021/0160550 A1* | 5/2021 | Katsavounidis | H04N 19/147 |
| 2024/0007619 A1* | 1/2024 | Hannuksela | H04N 19/107 |
| 2024/0305799 A1* | 9/2024 | Skupin | H04N 19/167 |

OTHER PUBLICATIONS

Partial Search Report for Application No. PCT/US2025/027807 dated Jul. 24, 2025.

* cited by examiner

*Primary Examiner* — Maryam A Nasri
(74) *Attorney, Agent, or Firm* — Artegis Law Group, LLP

(57) ABSTRACT

In various embodiments, a video editing application receives, from an encoding application, a list of random access points of an encoded media content item. When an operator specifies a point of interest for the media content item, the video editing application determines a closest random access point to the point of interest and modifies the point of interest to coincide with the closest random access point. The encoding application can also modify the point of interest to coincide with an existing random access point if the point of interest is within a tolerance of the existing random access point and the point of interest is not frame specific. Further, the encoding application can modify media metrics, computed using pre-encoded versions of the media content item, using heuristics to account for operator-specified points of interest that do not coincide with, or are not within a tolerance of, existing random access points.

20 Claims, 7 Drawing Sheets

TECHNIQUES FOR AVOIDING RE-ENCODING OF MEDIA CONTENT ITEMS

BACKGROUND

Field of the Invention

Embodiments of the present disclosure relate generally to computer science and video technology and, more specifically, to techniques for avoiding the re-encoding of media content items.

Description of the Related Art

As a general matter, many video encoding techniques reduce the sizes of videos through compression. A given media title in the form of a video can be encoded using different resolutions and/or encoding parameters to generate different encoded versions of the media title. These different encoded versions of the media title can then be used in applications, such as adaptive streaming, where a particular encoded version of the media title is streamed to one or more end point devices based on various factors, such as network conditions and the processing and decoding capabilities of the endpoint devices.

Media titles oftentimes include various points of interest, such as advertisement breaks and points that a viewer can skip to during playback of the media titles. For example, an operator, such as the creator or publisher of a media title, could use a video editing application to insert advertisement breaks at one or more points within a given media title. As another example, the operator could use the video editing application to insert, after the opening credits of a given media title, a point of interest that allows a viewer of the given media title to skip past the opening credits to the point of interest.

One approach for adding points of interest to a media title is to encode operator-specified points of interest as key frames (also referred to as "IDR (Instantaneous Decoder Refresh) frames") within an encoded version of the media title when the media title is encoded. The encoded version of the media title is typically packaged into various formats for distribution. The packaging usually includes a marking indicating that a given operator-specified point of interest is located either at the beginning of a new video segment or at a seek-point inside a video segment, thereby enabling a video player to jump quickly to any operator-specified point of interest within the media title.

One drawback of the above approach for encoding and packaging media titles is that operators oftentimes add and/or change the points of interest within media titles after the media titles have been encoded by an encoding pipeline or are already live on a streaming service. Each time an operator adds or changes the points of interest within a given media title, that media title needs to be re-encoded and re-packaged with new markings to enable a video player to jump to the added or changed points of interest. Having to re-encode and re-package media titles, as well as possibly re-deploying the re-encoded and re-packaged media titles to a content distribution network (CDN), to accommodate added or changed points of interest, oftentimes repeatedly, is very computationally expensive and time consuming.

As the foregoing illustrates, what is needed in the art are more effective techniques for encoding and packaging media titles.

SUMMARY OF THE EMBODIMENTS

One embodiment of the present disclosure sets forth a computer-implemented method for avoiding re-encoding of video sequences. The method includes performing one or more encoding operations on a source video sequence to generate a first encoded video sequence that includes a first set of random access points. The method further includes transmitting, to a video editing application, a list of the first set of random access points. In addition, the method includes receiving, from the video editing application, one or more points of interest, wherein a first point of interest included in the one or more points of interest is modified by the video editing application to coincide with a first random access point included in the first set of random access points.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that the disclosed techniques avoid re-encoding and re-packaging media content items associated with media titles, as well as re-deploying the re-encoded and re-packaged media content items to a CDN, when operators add and/or change points of interest within those media content items. Accordingly, implementing the disclosed techniques saves the computational resources and time that would be required to perform the re-encoding and re-packaging. The disclosed techniques also save computation resources and time by modifying media metrics that are computed based on pre-encoded media content items, without having to re-encode those pre-encoded media content items. In addition, the disclosed techniques permit client applications running on endpoint devices to switch between re-encoded versions of a media content item in an encoding ladder by simultaneously publishing the re-encoded versions of the media content item. These technical advantages represent one or more technological improvements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
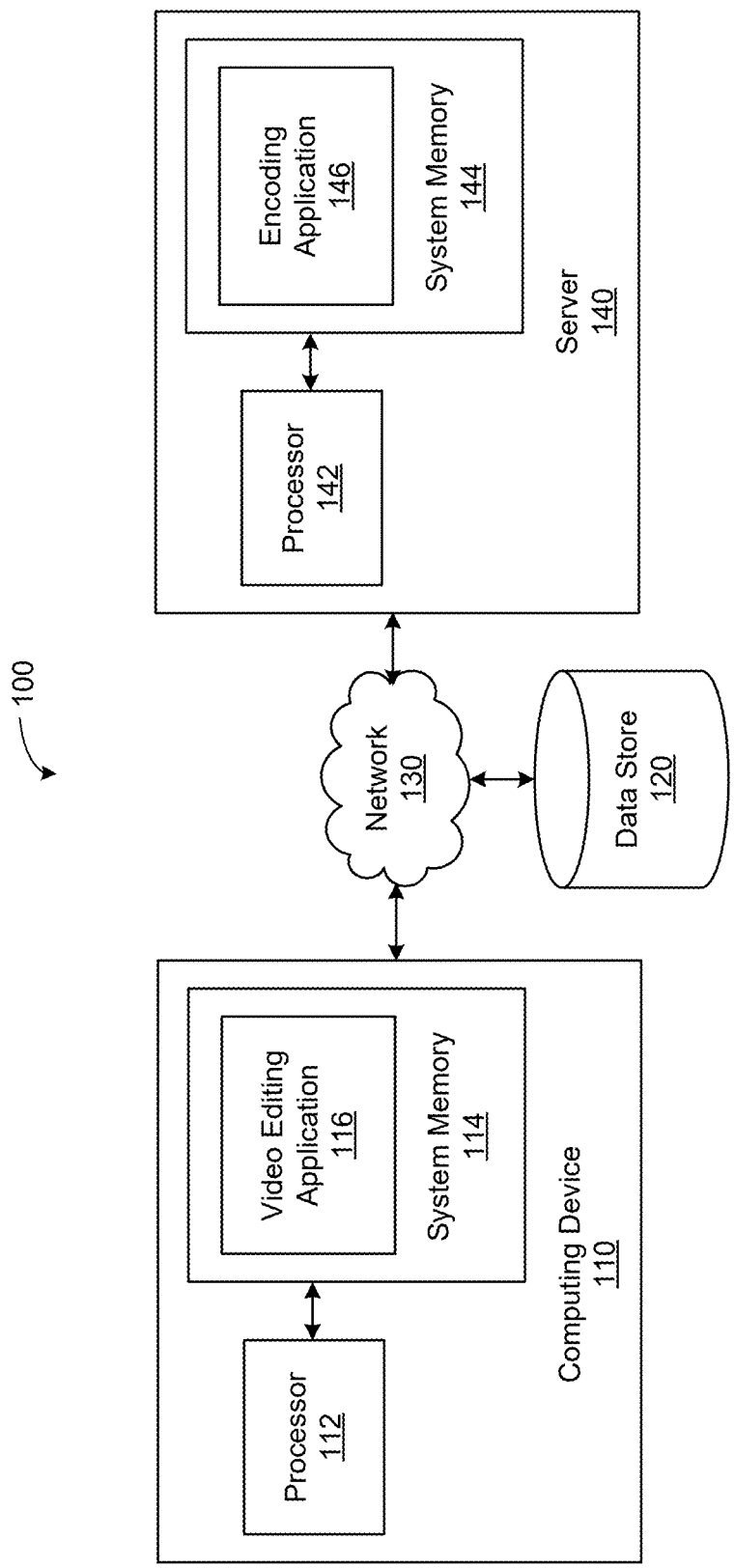
FIG. 1 illustrates a system configured to implement one or more aspects of the various embodiments.

As described, conventional approaches for encoding a media title perform encoding and packaging after an operator has specified points of interest within the media title. However, operators oftentimes add and/or change the points of interest within media titles during production. Each time an operator adds or changes the points of interest within a given media title, that media title needs to be re-encoded and re-packaged to enable a video player to jump to the added or changed points of interest. Having to re-encode and re-package media titles to accommodate added or changed points of interest, oftentimes repeatedly, is very computationally expensive and time consuming.

The disclosed techniques avoid re-encoding and re-packaging media content items. In some embodiments, a video editing application receives, from an encoding application, a list of random access points of an encoded media content item associated with a media title. When an operator specifies a new point of interest for the media content item, the video editing application determines a closest random access point to the new point of interest and modifies the new point of interest to coincide with the closest random access point. The video editing application accepts an operator adjustment to the (modified) point of interest if the operator disagrees with the modified point of interest. Then, the video editing application transmits the modified or operator-adjusted point of interest to an encoding application. The encoding application determines whether the transmitted point of interest is a frame accurate point of interest. If the transmitted point of interest is a frame accurate point of interest, then the encoding application determines whether the frame accurate point of interest coincides with an existing random access point of the encoded media content item. If the frame accurate point of interest does not coincide with any existing random access point, then the encoding application adds the frame accurate point of interest to a set of points of interest to be fulfilled through re-encoding of the media content item. On the other hand, if the transmitted point of interest is not a frame accurate point of interest, the encoding application determines whether the transmitted point of interest is within a tolerance of an existing random access point. If the transmitted point of interest is within the tolerance of the existing random access point, then the encoding application modifies the transmitted point of interest to coincide with the existing random access point. If the transmitted point of interest is not within the tolerance of the existing random access point, then the encoding application adds the transmitted point of interest to the set of points of interest to be fulfilled through re-encoding of the media content item. The encoding application re-encodes the media content item to generate a re-encoded media content item that includes keyframes for the points of interest in the set of points of interest to be fulfilled through re-encoding of the media content, assuming that the points of interest are not already fulfilled in any previously encoded versions of the media content item. If re-encoding is not performed, metadata corresponding to the latest points of interest can be conveyed downstream so that client applications can use the points of interest to deliver corresponding features such as ad breaks, skipping an introduction, etc. The encoding application also modifies media metrics, computed using pre-encoded versions of the media content item, using heuristics to account for the transmitted points of interest that do not coincide with, or are not within a tolerance of, existing random access points. In addition, the encoding application deploys re-encoded versions of the media content item in an encoding ladder and/or across encoding families at the same time after re-encoded versions of the media content item have been generated.

At least one technical advantage of the disclosed techniques relative to the prior art is that the disclosed techniques avoid re-encoding and re-packaging media content items associated with media titles when operators add and/or change points of interest within those media content items. Accordingly, implementing the disclosed techniques saves the computational resources and time that would be required to perform the re-encoding and re-packaging. The disclosed techniques also save computation resources and time by modifying media metrics that are computed based on pre-encoded media content items, without having to re-encode those pre-encoded media content items. In addition, the disclosed techniques permit client applications running on endpoint devices to switch between re-encoded versions of a media content item in an encoding ladder by simultaneously publishing the re-encoded versions of the media content item.

System Overview

FIG. 1 illustrates a system 100 configured to implement one or more aspects of the various embodiments. As shown, the system 100 includes a computing device 110, a data store 120, and a server 140 in communication over a network 130. The network 130 can be a wide area network (WAN) such as the Internet, a local area network (LAN), or any other suitable network.

As shown, a video editing application 116 executes on a processor 112 of the computing device 110 and is stored in a system memory 114 of the computing device 110. The processor 112 receives user input from input devices, such as a keyboard, a mouse, a joystick, a touchpad, or a touchscreen. In operation, the processor 112 is the master processor of the computing device 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The memory 114 of the computing device 110 stores content, such as software applications and data, for use by the processor 112 and the GPU. The memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 114. The storage may include any number and type of external memories that are accessible to the processor 112 and/or the GPU. For example, and without limitation, the storage may include a Secure Digital Card, an external Flash memory, a portable compact disc read-only memory (CD- ROM), an optical storage device, a magnetic storage device, or any suitable combination of the foregoing.

It will be appreciated that the computing device 110 shown herein is illustrative and that variations and modifications are possible. For example, the number of processors 112, the number of GPUs, the number of system memories 114, and the number of applications included in the memory 114 may be modified as desired. Further, the connection topology between the various units in FIG. 1 may be modified as desired. In some embodiments, any combination of the processor 112, the memory 114, and a GPU may be replaced with any type of virtual computing system, distributed computing system, or cloud computing environment, such as a public, private, or a hybrid cloud.

Among other things, the video editing application 116 is configured to receive operator-specified points of interest for media content items associated with media titles, and the video editing application 116 can modify the operator-specified points of interest to coincide with existing random access points of encoded media content items, thereby avoiding re-encoding and re-packaging the media content items. Illustratively, the video editing application 116 is in communication over the network 130 with an encoding application 146 that is stored in a memory 144, and executes on a processor 142, of the server 140. Among other things, the encoding application 146 is configured to re-encode media content items to fulfill operator-specified points of interest when needed, while avoiding such re-encodings when the operator-specified points of interest can be modified to coincide with existing random access points for encoded media content items. The video editing application 116 and the encoding application 146 are discussed in greater detail below in conjunction with FIGS. 2-7.

In some embodiments, components of the server 140, including the memory 144 and the processor 142, can be similar to corresponding components of the computing device 110. In some embodiments, any combination of the processor 142, the memory 144, and a GPU in the server 140 may be replaced with any type of virtual computing system, distributed computing system, or cloud computing environment, such as a public, private, or a hybrid cloud.

In some embodiments, media content items and/or other data can be stored in, and downloaded from, the data store 120 or elsewhere. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the server 140 may include the data store 120.

The number of servers, computing devices, and data stores may be modified as desired in some embodiments. Further, the functionality included in any of the applications may be divided across any number of applications or other software that are stored and executed via any number of devices that are located in any number of physical locations.

Avoiding Re-Encoding Media Content Items

Figure 2:
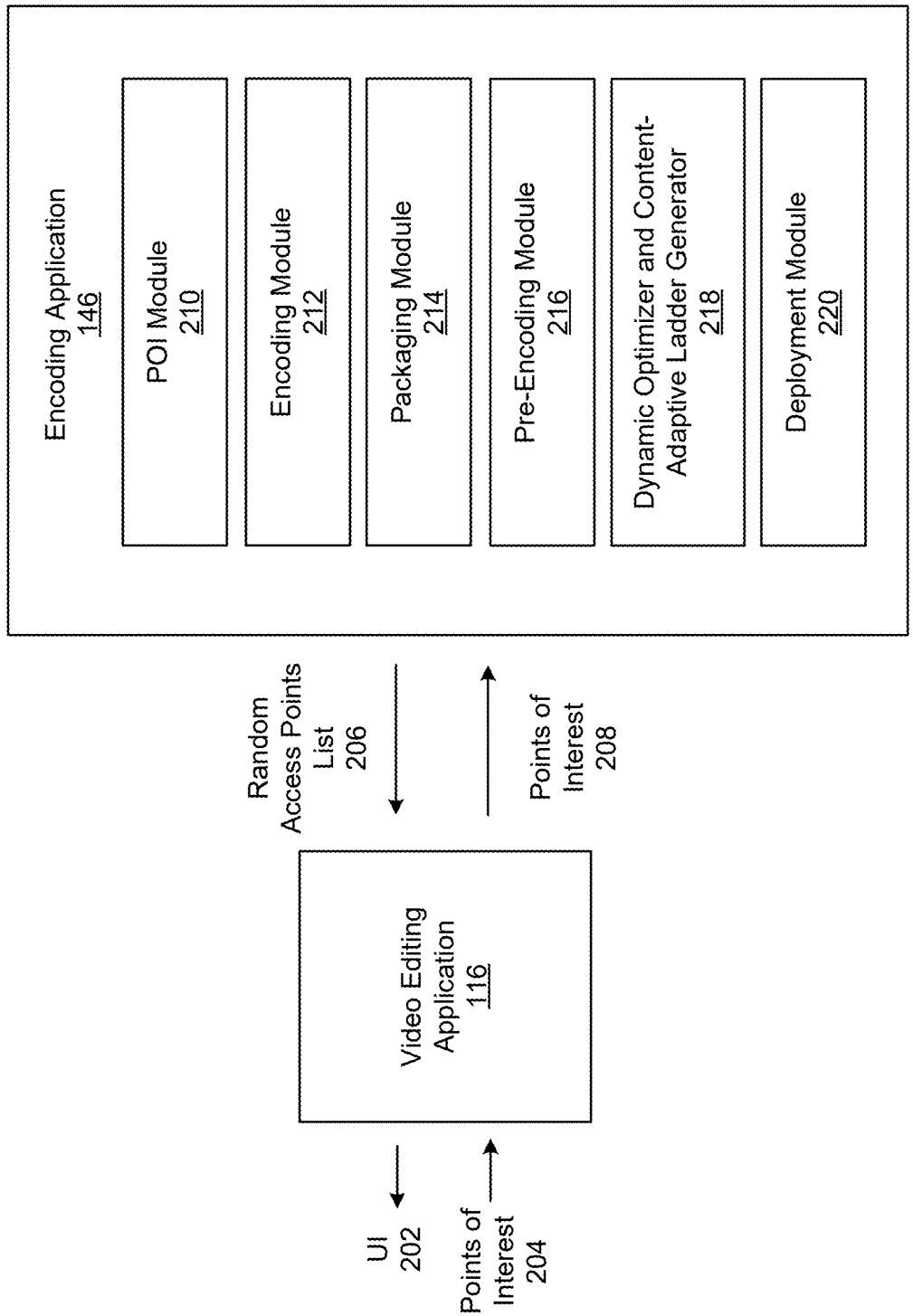
FIG. 2 is a more detailed illustration of the video editing application and the encoding application of FIG. 1, according to various embodiments.

FIG. 2 is a more detailed illustration of the video editing application 116 and the encoding application 146 of FIG. 1, according to various embodiments. As shown, the video editing application 116 is in communication with the encoding application 146, such as via the network 130. The video editing application 116 can provide any technically feasible functionality for the post-production video editing of the digital video sequences of media content items. For example, in some embodiments, the video editing application 116 can permit an operator to edit video sequences by adding and removing elements, applying effects, adjusting colors and audio, and/or the like.

Illustratively, for a given media content item that includes a video sequence and is associated with a media title, the video editing application 116 receives, from the encoding application 146, a list of random access points 206 included in an encoded version of the media content item ("encoded media content item"). Examples of media content items include, without limitation, any portion (including all) of feature length films, episodes of television programs, and music videos, to name a few. In some embodiments, the list of random access points 206 can include random access points corresponding to the boundaries of shots that were automatically detected in the media content item and encoded as key frames in the encoded media content item. In some embodiments, the list of random access points 206 can include random access points corresponding to other key frames within the encoded media content item, such as key frames at the boundaries of segments of a predefined length within shots that are longer than a threshold, key frames corresponding to previously fulfilled points of interest (POIs) that were provided by operators via the video editing application 116, etc., The video editing application 116 can receive the list of random access points 206 from the encoding application 146 in any technically feasible manner in some embodiments, such as by downloading the list of random access points 206 along with the encoded media content item. Further, the list of random access points 206 can indicate the random access points in any suitable manner, such as a list of timestamps of the random access points, a list of frame numbers of the random access points, or the like. Although described herein primarily with respect to the list of random access points 206 of an encoded media content item, in some embodiments, the video editing application 116 can receive a list that includes a subset of such random access points. For example, if an encoded media content item includes a large number of random access points, then the encoding application 146 could transmit a list that includes a subset of most salient random access points to the video encoding application 116.

As also shown, the video editing application 116 causes a user interface (UI) 202 to be displayed as output to an operator. In some embodiments, the UI 202 can include any suitable elements for editing the encoded media content item, including inserting points of interest into the encoded media content item, editing points of interest within the encoded media content item, and/or removing points of interest from the encoded media content item. For example, the operator can insert points of interest 204 corresponding to the splice points of advertisement breaks, the beginnings and endings of advertisement breaks, points (e.g., after the opening credits or an opening animation) that a viewer can skip to during playback of the encoded version(s) of the media content item, and/or the like. In some embodiments, when the video editing application 116 receives the points of interest 204 from the operator via the UI 202, the video editing application 116 can modify one or more of the points of interest 204 to avoid causing the encoding application 146 to re-encode the encoded media content item. In such cases, the video editing application 116 can modify a point of interest by (1) determining a closest random access point to the point of interest, and (2) updating the point of interest to coincide with the closest random access point, thereby "snapping" the point of interest to the closest random access point. In some embodiments, the operator can select (e.g., via the UI 202) to enable such modifications. In some other embodiments, the modifications are made automatically. By modifying the point of interest to coincide with the closest random access point, re-encoding of the media content item (and repackaging) can be avoided because the closest random access point (and an associated packaging marker) already exists for the modified point of interest. It should be noted that, even when re-encoding does not occur, the modified point of interest can still be stored in a data store that is able to store multiple points of interest having the same timestamp, and the modified point of interest can still be conveyed downstream so client applications/players can use the modified point of interest to deliver the corresponding feature.

In addition, the video editing application 116 can display the modified point of interest to the operator via the UI 202. The operator can then either accept the modified point of interest, such as by not taking any action, pressing an "accept" button, or the like, or the operator can adjust the modified point of interest via the UI 202 to a different frame and time. If the operator adjusts the modified point of interest, then the video editing application 116 accepts the adjustment to the point of interest and uses the operator-adjusted point of interest rather than the modified point of interest. That is, the video editing application 116 permits the operator to override the modified point of interest.

Figure 3:
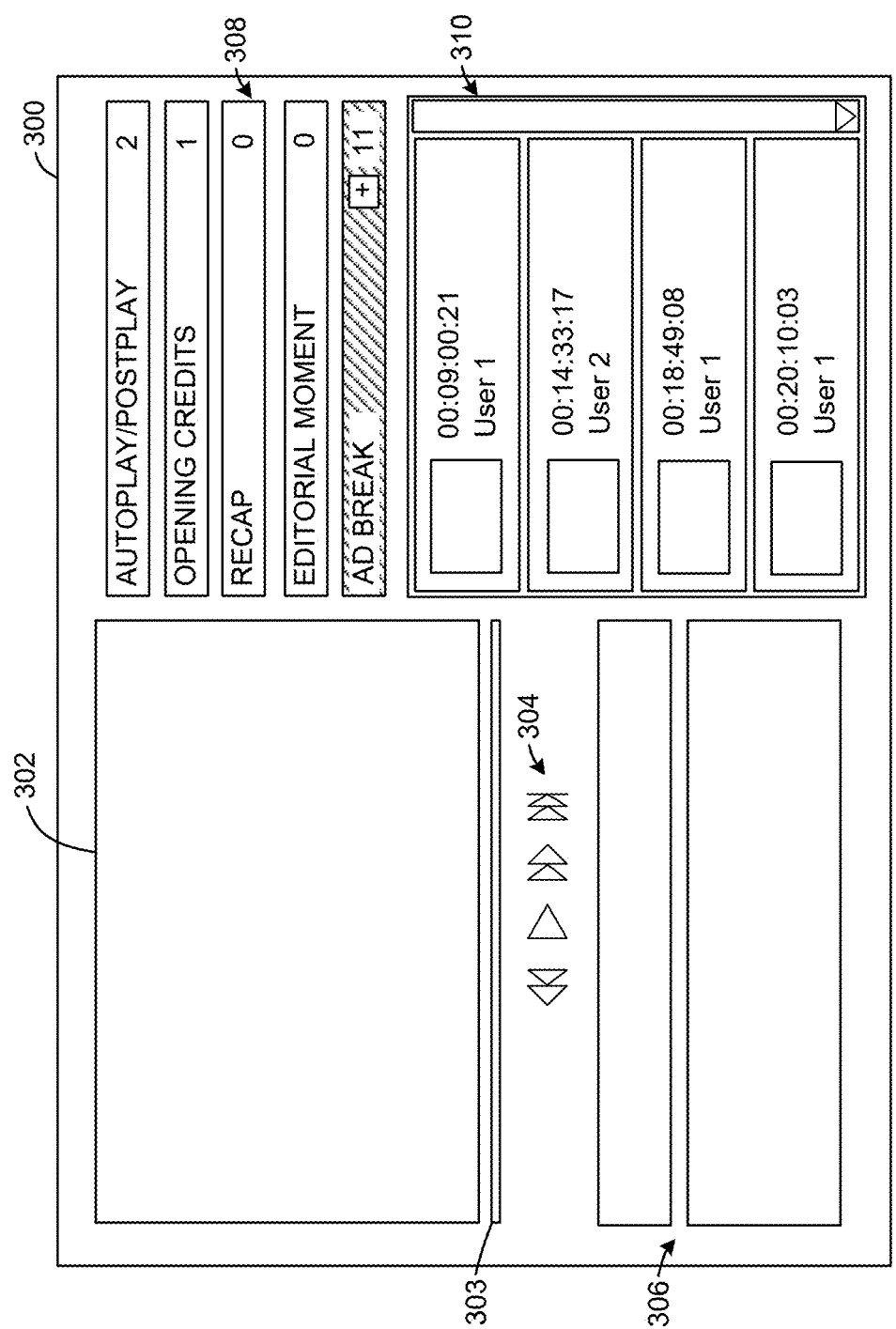
FIG. 3 illustrates an exemplar user interface presented by the video editing application of FIG. 1, according to various embodiments.

FIG. 3 illustrates an exemplar user interface 300 that can be presented by the video editing application 116 of FIG. 1, according to various embodiments. The UI 300 can correspond to the UI 202, described above in conjunction with FIG. 2. As shown, the UI 300 includes a video player 302 for playing media content items, a timeline 303 and control buttons 304 for navigating within a media content item, including frame-by-frame navigation, and sections 306 that provide various tools for editing a media content item, such as tools for adding and removing elements, applying effects, adjusting colors and audio, and/or the like. Although the UI 300 with specific elements is shown for illustrative purposes, in other embodiments, a video editing application can display a UI that includes any suitable elements.

The UI 300 also includes a section 308 that displays different categories of points of interest, shown as the autoplay/postplay, opening credits, recap, editorial moment, and ad break categories. In some embodiments, the section 308 can permit an operator to add a point of interest to a selected category, shown as the ad break category, as well as add and/or remove categories of points of interest.

In addition, the UI 300 includes a section 310 that displays a grid of the previously annotated points of interests that are associated with a selected category. Illustratively, the ad break category is associated with a number of operator-specified points of interest for advertisement breaks, and each point of interest is presented using a thumbnail of a frame corresponding to the point of interest, a timestamp of the point of interest, and information indicating an operator who created the point of interest. When an operator inserts a point of interest for an advertisement break, the video editing application 116 can modify the point of interest to coincide with an existing random access point of the encoded media content item, as described above in conjunction with FIG. 2. The video editing application 116 can then display, within the section 310, a thumbnail of a frame corresponding to the modified point of interest, a timestamp of the modified point of interest, and information indicating the operator.

Figure 4:
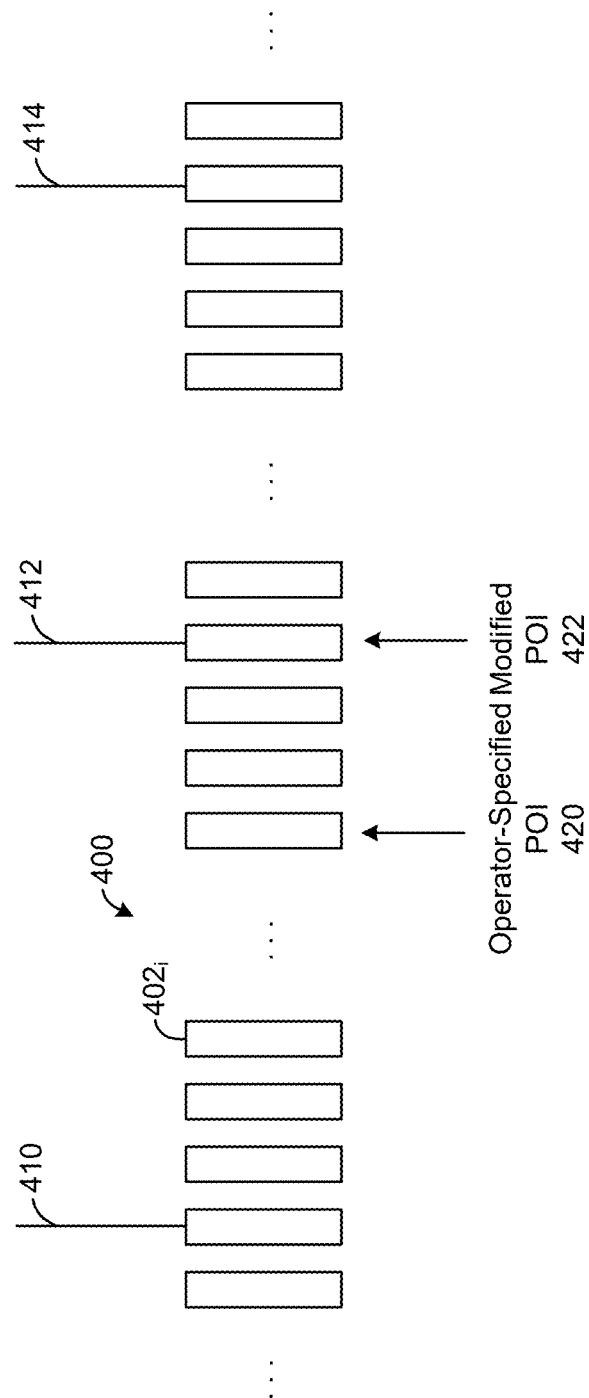
FIG. 4 illustrates an exemplar modification of an operator-specified point of interest, according to various embodiments.

FIG. 4 illustrates an exemplar modification of an operator-specified point of interest, according to various embodiments. As shown, a media content item 400 includes multiple frames 402i (referred to herein collectively as frames 402 and individually as a frame 402). The media content item 400 further includes a number of contiguous and non-overlapping shot sequences, each of which includes a set of frames that can have similar spatial-temporal properties and run for an uninterrupted period of time. Illustratively, shot sequence boundaries 410, 412, and 414 are frames 402 at the boundaries between successive shot sequences. In some embodiments, existing random access points of an encoded media content item, such as the random access points corresponding to the shot sequence boundaries 410, 412, and 414, are not displayed to an operator via a UI (e.g., UI 300). In some embodiments, existing random access points of an encoded media content item can be displayed to an operator via a UI.

Illustratively, when an operator specifies a point of interest 420 via, e.g., the UI 300, the video editing application 116 determines a closest shot sequence boundary 412 to the operator-specified point of interest 420. Then, the video editing application 116 modifies the operator-specified point of interest 420 to coincide with the shot sequence boundary 412, thereby generating a modified point of interest 422. In addition, the video editing application 116 can display the modified point of interest 422 to the operator (e.g., via the UI 202) and permit the operator to either accept or adjust the modified point of interest 422. If the operator adjusts the modified point of interest 422, then the video editing application 116 accepts the adjustment to the modified point of interest 422.

Although FIG. 4 is described with respect to shot boundaries as an illustrative example, in some embodiments, the video editing application 116 can modify an operator-specified point of interest to coincide with any random access point of an encoded media content item, such as a key frame at the boundary of a segment of a predefined length when a shot that is longer than a threshold are divided into such segments.

Returning to FIG. 2, after receiving the operator-specified points of interest 204, modifying the points of interest 204 as appropriate, and/or accepting operator adjustments to the modified points of interests, the video editing application 116 transmits a list of the points of interest 208 to the encoding application 146. As shown, the encoding application 146 includes a point of interest (POI) module 210, an encoding module 212, a packaging module 214, a pre-encoding module 216, and a dynamic optimizer and content-adaptive ladder generator 218, and a deployment module 220.

The point of interest module 210 processes the points of interest 208 received from the video editing application 116. If appropriate, the point of interest module 210 can cause one or more of the points of interest 208 that are not yet fulfilled by random access points in the encoded media content item to be fulfilled through re-encoding of the media content item that adds keyframes for the point(s) of interest. In some embodiments, the point of interest module 210 processes each of the points of interest 208 by first determining whether the point of interest is a frame accurate point of interest. Frame accurate points of interest are points of interest that cannot be modified to a different frame and time. Frame accurate points of interest can be defined in any suitable manner in some embodiments. For example, in some embodiments, points of interest belonging to certain categories, such as advertisement breaks, are required to be frame accurate, while points of interest belonging to other categories, such as skipping the opening credits or an opening animation, are not required to be frame accurate. As another example, in some embodiments, an operator can specify (e.g., via the UI 202) that particular points of interest are frame accurate points of interest. If the point of interest module 210 determines that a received point of interest is a frame accurate point of interest, then the point of interest module 210 further determines whether the frame accurate point of interest coincides with an existing random access point of the encoded media content item. If the frame accurate point of interest coincides with an existing random access point, then the encoded media content item does not need to be re-encoded to fulfill the frame accurate point of interest. For example, in some cases, an operator may remove a point of interest from an encoded media content item and then add the point of interest back to the encoded media content item. In such cases, the encoding application 146 could not re-encode the encoded media content item when the point of interest is removed, thereby leaving a random access point corresponding to the removed point of interest in the encoded media content item. Then, when the operator adds the point of interest back to the encoded media content item, the point of interest module 210 can determine that the point of interest coincides with an existing random access point and, as a result, avoid re-encoding the encoded media content item.

On the other hand, if the frame accurate point of interest does not coincide with any existing random access point, then the point of interest module 210 adds the frame accurate point of interest to a set of points of interest to be fulfilled through re-encoding of the media content item. Alternatively, if the point of interest module 210 determines that a received point of interest is not a frame accurate point of interest, then the point of interest module 210 further determines whether the point of interest is within a tolerance of an existing random access point. For example, in some embodiments, the tolerance can be 5-10 frames. If the point of interest is within the tolerance of an existing random access point, then the point of interest module 210 modifies the point of interest to coincide with that existing random access point, and the encoded media content item does not need to be re-encoded to fulfill the point of interest. On the other hand, if the point of interest is not within the tolerance of an existing random access point, then the point of interest module 210 adds the point of interest to the set of points of interest to be fulfilled through re-encoding of the media content item. After processing all of the received points of interest 208, the point of interest module 210 causes the media content item to be re-encoded by the encoding module 212, if necessary, to generate a re-encoded media content item that includes keyframes for any points of interest in the set of points of interest to be fulfilled through re-encoding of the media content item.

In some embodiments, the point of interest module 210 (or another module) also transmits lists of random access points of encoded media content items (e.g., the list of random access points 206) to the video editing application 116. For example, if the received points of interest 208 require re-encoding of a media content item into a re-encoded media content item that includes new random access points, then the point of interest module 210 (or another module) can transmit a list of the random access points of the re-encoded media content item to the video editing application 116. The above process of receiving operator-specified points of interest; modifying the operator-specified points of interest as appropriate; re-encoding the media content item, if necessary, based on the modified (or operator-specified) points of interest; and transmitting a list of random access points of the re-encoded media content item to the video editing application 116 (thereby permitting the video editing application 116 to execute seek functionality correctly with respect to those random access points), can then repeat any number of times.

In some embodiments, the point of interest module 210 can also check to ensure that random access points are not too close to each other (e.g., within a threshold of each other) and/or video segments are not too short. Cases in which random access points are too close to each other and video segments are too short can be handled in various ways in some embodiments. For example, in some embodiments, when one point of interest is not a frame accurate point of interest, then the video editing application 116 can drop the point of interest that is not frame accurate, but the video editing application 116 can honor two frame accurate points of interest even if the two points of interest are adjacent frames. As another example, in some embodiments, the video editing application 116 can enforce a minimum distance between neighboring points of interest and let a user know if the user tries to place two points of interest too close together. As a further example, in some embodiments, the video editing application 116 can permit points of interest that are too close to each other, and the encoding application can adapt to, e.g., only encode a keyframe at one of the points of interest.

Although described herein primarily with respect to transmitting the list of random access points 206 from the encoding application 146 to the video editing application prior to receiving the operator-specified points of interest 204, in some cases, an operator may specify points of interest before a media content item is encoded. In such cases, when the encoding application 146 encodes the media content item, the encoding application 146 can modify points of interest that are not frame specific to coincide with, e.g., shot boundaries that are encoded as random access points (or, alternatively, not fulfill the shot boundary exactly), and not modify points of interest that are frame specific, meaning that a random access point is added for the frame specific points of interest when the media content is encoded. Alternatively, in some other embodiments, the encoding application 146 can still honor points of interest that are not frame specific. A list of random access points from such an encoding can then be transmitted to the video editing application 116, an operator can specify additional points of interest, etc., as described above.

The encoding module 212 is configured to encode media content items. The encoding process reduces the sizes of the media content items through compression. The encoding module 212 can perform any technically feasible encoding technique(s), including known techniques for encoding media content items, in some embodiments. As described, in some embodiments, the encoding module 212 can re-encode a media content item to add keyframes for the points of interest to be fulfilled that is determined by the point of interest module 210.

The packaging module 214 is configured to package encoded media content items, generated by the encoding module 212, into one or more formats for distribution. The packaging module 214 can perform any technically feasible packaging technique(s), including known techniques for packaging media content items, in some embodiments. In some embodiments, the packaging for an encoded media content item includes, for each point of interest, a marking indicating that the point of interest is located either at the beginning of a new video segment or at a seek-point inside a video segment, thereby enabling a video player to jump quickly to the point of interest within the media content item.

The pre-encoding module 216 is configured to generate pre-encoded versions of media content items for the purpose of computing media metrics, which can then be used to determine optimal encoding(s) of the media content items for bitrate ladders. As used herein, a media metric refers to any measurement that corresponds to one or more properties of encoded video content, video content, audio content, and/or encoded audio content. Some examples of media metrics include, without limitation, bitrate, distortion metrics, audio quality metrics, visual quality metrics, etc. Examples of visual quality metrics include, without limitation, a peak signal-to-noise ratio (PSNR), a linear video multimethod assessment fusion (VMAF) metric, and a harmonic VMAF (VMAFh), to name a few. In some embodiments, the pre-encoding module 216 can generate pre-encoded versions of a media content item by encoding the media content item at multiple different resolutions and encoding parameters, such as quantization parameter (QP) values, bitrate, etc.

The dynamic optimizer and content-adaptive ladder generator 218 is configured to (1) compute media metrics for pre-encoded versions of media content items generated by the pre-encoding module 216, and (2) determine optimal resolutions and encoding parameters for encoding the media content items to generate one or more bitrate ladders (also referred to herein as an "encoding ladders") for each media content item. As used herein, a bitrate ladder for a media content item is used to optimize the overall visual experience that a media streaming service provides to viewers. The bitrate ladder for a given media content item allows endpoint devices to achieve a target visual quality during playback of the media content item based on an available bandwidth. Each rung in the bitrate ladder specifies a different bitrate-resolution pair corresponding to a different pre-generated encoded version of the media content item. In some embodiments, the dynamic optimizer and content-adaptive ladder generator 218 can compute any suitable media metrics and determine the optimal resolutions and encoding parameters in any technically feasible manner. For example, in some embodiments, the dynamic optimizer and content-adaptive ladder generator 218 can compute the media metrics and determine the optimal resolutions and encoding parameters by using a convex hull to minimize the bitrate for different distortion levels, as disclosed in U.S. Pat. No. 10,911,791, entitled "OPTIMIZING ENCODING OPERATIONS WHEN GENERATING A BUFFER-CONSTRAINED VERSION OF A MEDIA TITLE," which is hereby incorporated herein by reference in its entirety.

In some embodiments, the dynamic optimizer and content-adaptive ladder generator 218 can modify the media metrics computed for pre-encoded versions of a media content item when the encoding application 146 receives operator-specified points of interest (e.g., points of interest 208) that do not coincide with any existing random access points that are included in the pre-encoded versions of the media content item. In such cases, the dynamic optimizer and content-adaptive ladder generator 218 can modify the media metrics based on predefined heuristics for each operator-specified point of interest that does not coincide with any existing random access point in the pre-encoded versions of the media content item. In some embodiments, the heuristics include, for each operator-specified point of interest that does not coincide with any existing random access point in the pre-encoded media content items, increasing a size that is computed for each pre-encoded version of the media content item in order to account for the increased size of an additional keyframe that would need to be added to the pre-encoded version of the media content item to fulfill the operator-specified point of interest. For example, in some embodiments, the size can be increased by multiplying the size of a non-keyframe that needs to be encoded as a keyframe by a constant greater than 1 (e.g., 20) to account for the increase in the number of bytes when the non-keyframe is replaced with a keyframe. In such cases, the constant can be selected based on the particular codec, resolution, and/or the like associated with the pre-encoded media content items in order to minimize the approximation error from the fact that the pre-encoded media content items are missing certain random access points or keyframes in general. In some embodiments, the heuristics include, for each operator-specified point of interest that does not coincide with any existing random access point in the pre-encoded media content item, increasing a quality that is computed for each pre-encoded version of the media content item by a predefined amount to account for the increased quality provided by an additional keyframe that would need to be added to the pre-encoded version of the media content item to fulfill the operator-specified point of interest. After modifying the media metrics, the dynamic optimizer and content-adaptive ladder generator 218 can determine, based on the modified media metrics, optimal resolutions and encoding parameters for encoding the media content item, as described above. Because the media metrics are modified to account for the operator-specified points of interest, the media metrics can more closely approximate values that would be computed for the final encoded media content items, and more optimal resolutions and encoding parameters can be determined. Because the media metrics are modified without pre-encoding the media content item again, computation resources and time are saved.

The deployment module 220 deploys encoded versions of the media content item when all encodings for the bitrate ladder are completed. For example, the encoded versions of the media content item could be deployed to replace other encoded versions of the media content item for a previous bitrate ladder. The encoded versions of the media content item can be deployed in any technically feasible manner in some embodiments. For example, in some embodiments, the encoded versions of the media content item can be deployed to one or more servers, such as the servers of a content distribution network, that publish the encoded versions of the media content item for, e.g., streaming by client applications. At or around the same time, the client applications can be notified of the locations of the encoded versions of the media content item that are live. Deploying the encoded versions of the media content item when all encodings for the bitrate ladder are completed helps to ensure that client applications running on endpoint devices can switch between the encoded versions of the media content item, because the encoded versions will all include the same random access points that can be used to switch between the encoded versions. In some embodiments, encoded versions of a media content item are deployed when all encodings for the bitrate ladders across different encoding families, such as encodings using different codecs, are completed. Deploying the encoded versions of the media content item when all encodings for the bitrate ladders across different encoding families are completed permits client applications running on endpoint devices to switch between codecs without experiencing playback issues because segments and random access points will be aligned across all of the encodes.

Figure 5:
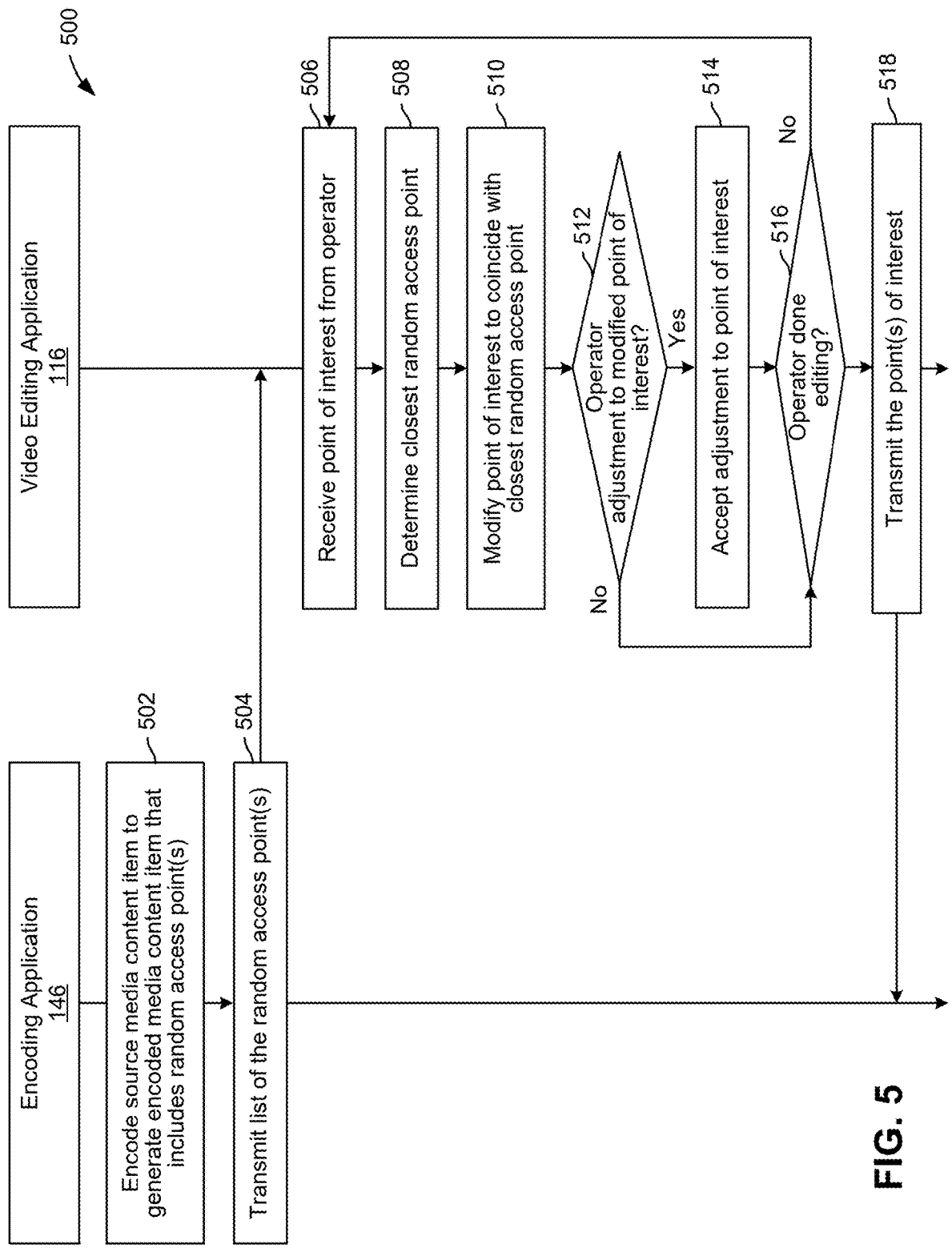
FIG. 5 is a flow diagram of method steps for modifying an operator-specified point of interest, according to various embodiments.

FIG. 5 is a flow diagram of method steps for modifying an operator-specified point of interest, according to various embodiments. Although the method steps are described with reference to the systems of FIGS. 1-2, persons skilled in the art will understand that any system configured to implement the method steps, in any order, falls within the scope of the present disclosure.

As shown, a method 500 begins at step 502, where the encoding application 146 encodes a source media content item to generate an encoded media content item that includes one or more random access points. In some embodiments, the random access points can be encoded as key frames. In some embodiments, the encoded media content item can also be packaged for distribution, and the packaging can include a marking for each random access point that is located either at the beginning of a new video segment or at a seek-point inside a video segment, thereby enabling a video player to jump quickly to any random access point within the media title.

At step 504, the encoding application 146 transmits a list of the random access point(s) to the video editing application 116. The list can indicate the random access point(s) in any technically feasible manner. For example, in some embodiments, the list can include timestamps and/or frame numbers associated with the random access point(s). In some embodiments, the list of random access points can include random access points corresponding to the boundaries of shots that were automatically detected in the media content item and encoded as key frames. In some embodiments, the list of random access points can include random access points corresponding to other key frames within the media content item, such as key frames at the boundaries of segments of a predefined length within shots that are longer than a threshold. In some embodiments, the list of random access points can include a subset of random access points of the encoded media content item when the encoded media content item includes a large number of random access points.

At step 506, the video editing application 116 receives a point of interest for the encoded media content item from an operator. In some embodiments, the point of interest can be for an advertisement break, a point within the media content item that a viewer can skip to, or the like. The video editing application 116 can receive the point of interest in any technically feasible manner. For example, in some embodiments, the video editing application 116 can receive the point of interest via a user interface, such as the UI 300 described above in conjunction with FIG. 3.

At step 508, the video editing application 116 determines a closest existing random access point to the point of interest received at step 506. In some embodiments, the video editing application 116 can identify the closest existing random access point as a random access point of the encoded media content item that is associated with a frame number that is closest to a frame number of the point of interest. In some embodiments, the video editing application 116 can identify the closest existing random access point as a random access point of the encoded media content item that is associated with a timestamp that is closest to a timestamp of the point of interest.

At step 510, the video editing application 116 modifies the point of interest to coincide with the closest random access point. In some embodiments, the video editing application 116 can change a frame number and/or timestamp of the point of interest to be a frame number and/or timestamp, respectively, of the closest random access point.

At step 512, if the video editing application 116 receives an operator adjustment to the modified point of interest, then the method 500 continues to step 514, where the video editing application 116 accepts the operator adjustment to the modified point of interest.

After the video editing application 116 accepts the operator adjustment to the modified point of interest, or if the video editing application 116 does not receive an operator adjustment to the modified point of interest, the method 500 continues to step 514. At step 514, if the operator is not done editing the media content item, then the method 500 returns to step 506, where the video editing application 116 receives another point of interest for the media content item from the operator.

On the other hand, if the operator is done editing the media content item, then the method 500 continues to step 518, where the video editing application 116 transmits the point(s) of interest to the encoding application 145. The operator can indicate that he or she is done editing the media content item in any technically feasible manner, such as via the same UI being used to edit the media content item.

Figure 6:
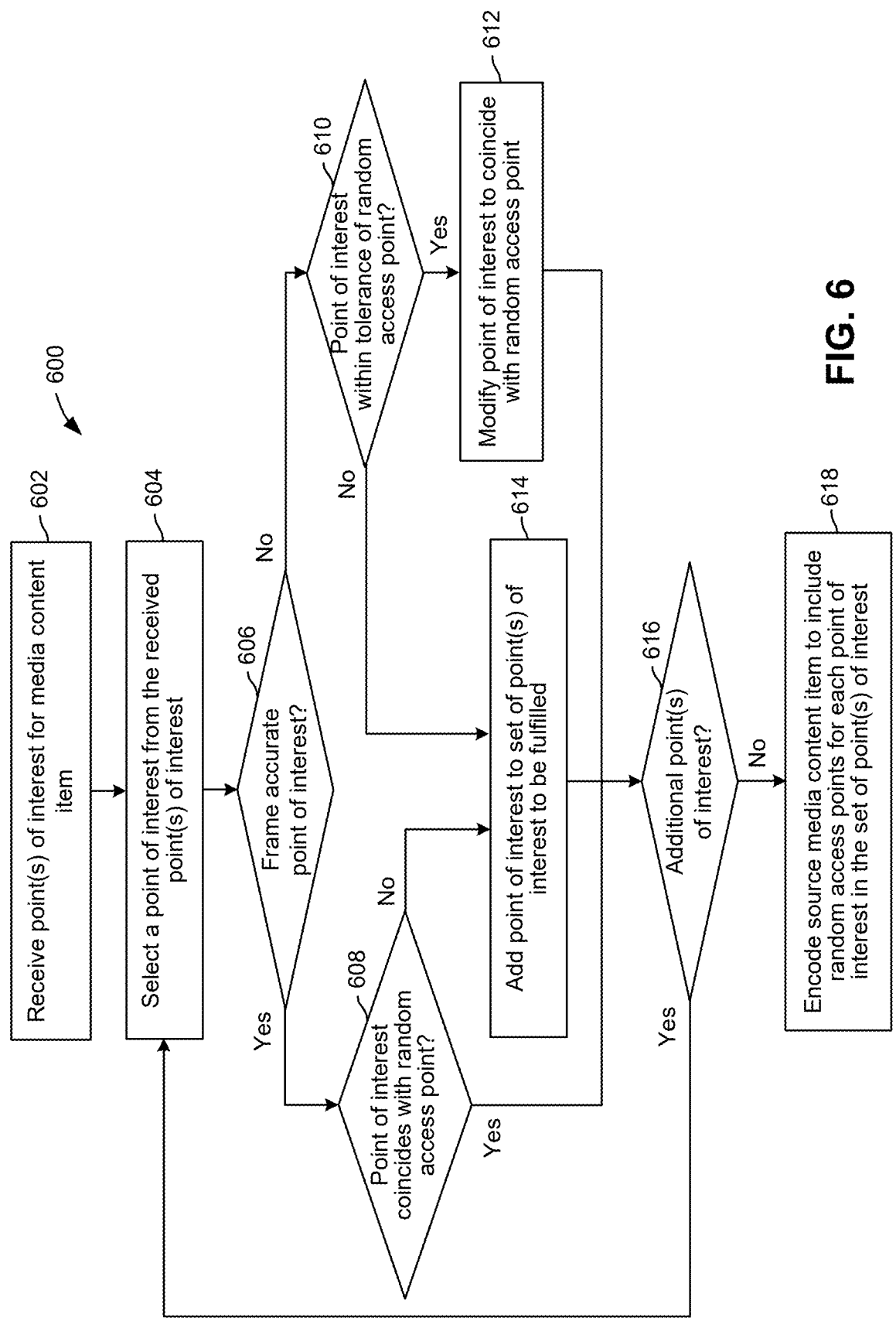
FIG. 6 is a flow diagram of method steps for encoding a source media content item, according to various embodiments.

FIG. 6 is a flow diagram of method steps for encoding a source media content item, according to various embodiments. Although the method steps are described with reference to the systems of FIGS. 1-2, persons skilled in the art will understand that any system configured to implement the method steps, in any order, falls within the scope of the present disclosure.

As shown, a method 600 begins at step 602, where the encoding application 146 receives one or more points of interest for a media content item from the video editing application 116. For example, the point(s) of interest that the encoding application 146 receives can be the point(s) of interest transmitted by the video editing application 116 at step 518, described above in conjunction with FIG. 5.

At step 604, the encoding application 146 selects a point of interest from the received point(s) of interest for processing. Although described herein primarily with respect to processing received points of interest sequentially as a reference example, in some embodiments, received points of interest can instead be processed in parallel.

At step 606, if the point of interest is a frame accurate point of interest, then the method 600 continues to step 608, where the encoding application 146 determines if the point of interest coincides with an existing random access point for the media content item.

On the other hand, if the point of interest is not a frame accurate point of interest, then the method 600 continues to step 610, where the encoding application 146 determines if the point of interest is within a tolerance of an existing random access point for the media content item. For example, in some embodiments, the tolerance can be 5-10 frames. If the point of interest is within the tolerance of an existing random access point for the media content item, then the method continues to step 612, where encoding application 146 modifies the point of interest to coincide with the existing random access point that the point of interest is within the tolerance of.

If the encoding application 146 determines at step 608 that the point of interest does not coincide with any existing random access point for the media content item, or if the encoding application 146 determines at step 610 that the point of interest is not within the tolerance of any existing random access point for the media content item, then the method 600 continues to step 614, where the encoding application 146 adds the point of interest to a set of point(s) of interest to be fulfilled.

At step 616, if there are additional point(s) of interest in the received point(s) of interest for the media content item, then the method 600 returns to step 604, where the encoding application 146 selects another point of interest from the received point(s) of interest for processing.

On the other hand, if there are no additional point(s) of interest, then the method 600 continues to step 618, where the encoding application 146 encodes a source media content item to include random access points for each point of interest in the set of point(s) of interest. In some embodiments, step 618 is optional if all the points of interest are already honored in an existing encoded file, in which case the re-encoding at step 618 is not performed, thereby saving compute cost and time. In other words, step 618 can be optional/conditional on having at least one point of interest not already fulfilled by any existing encoded versions of the media content item. If step 618 is not performed, metadata corresponding to the latest points of interest can be conveyed downstream so that client applications can use the points of interest to deliver corresponding features such as ad breaks, skipping an introduction, etc. In some embodiments, the source media content item can be re-encoded at step 618 to include keyframes corresponding to each point of interest in the set of point(s) of interest. In some embodiments, the encoding application 146 can also package the re-encoded media content item to include markers to the keyframes.

Figure 7:
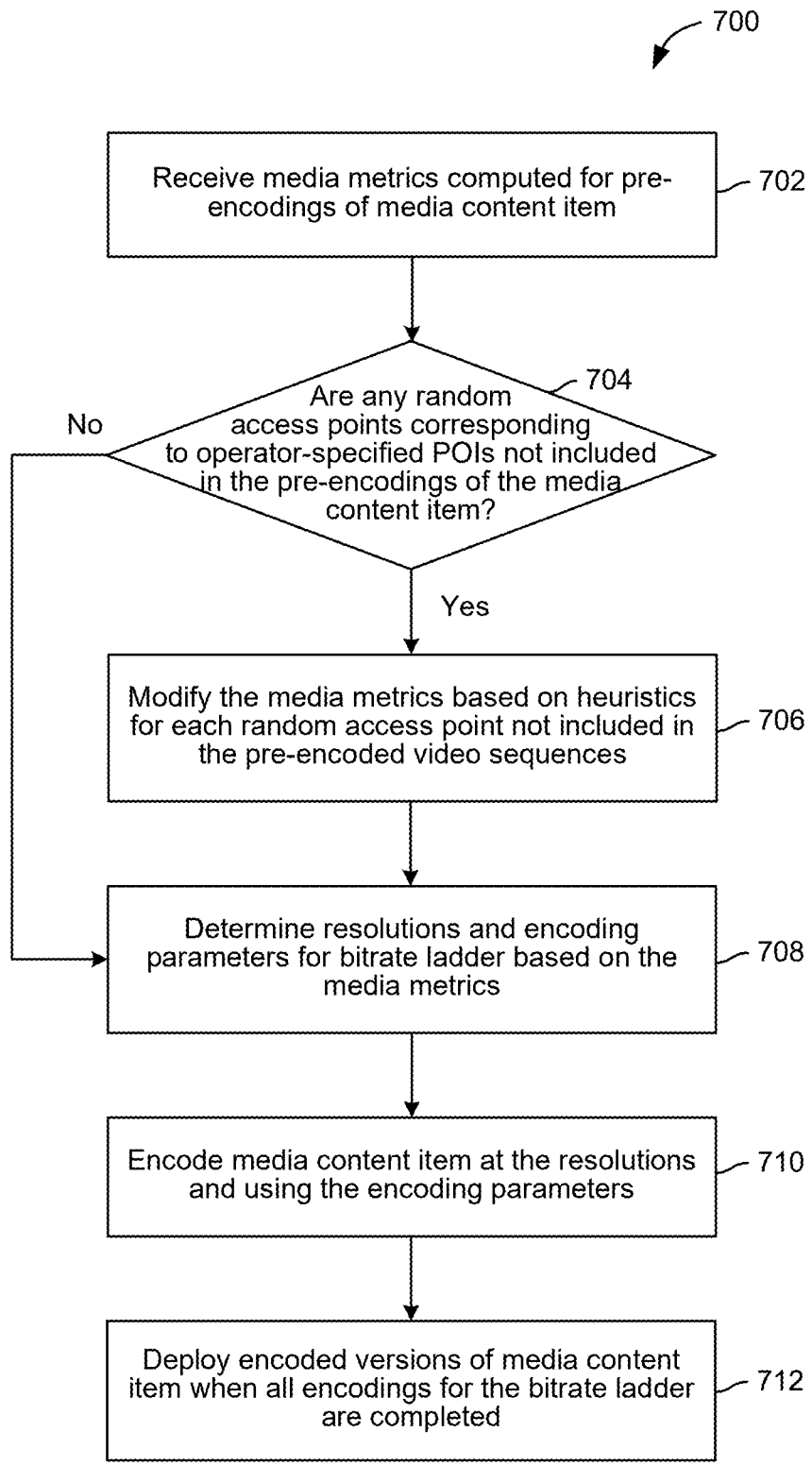
FIG. 7 is a flow diagram of method steps for generating multiple encoded versions of a media content item for a bitrate ladder, according to various embodiments.

FIG. 7 is a flow diagram of method steps for generating multiple encoded versions of a media content item for a bitrate ladder, according to various embodiments. Although the method steps are described with reference to the systems of FIGS. 1-2, persons skilled in the art will understand that any system configured to implement the method steps, in any order, falls within the scope of the present disclosure.

As shown, a method 700 begins at step 702, where the encoding application 146 receives media metrics computed for a number of pre-encodings of a media content item. Although described with respect to receiving the media metrics for simplicity, the encoding application 146 can compute the media metrics in some embodiments.

At step 704, the encoding application 146 determines whether any random access points corresponding to operator-specified points of interest are not included in the pre-encodings of the media content item. In some embodiments, the random access points corresponding to operator-specified points of interest can be within a tolerance of the operator-specified points of interest when the operator-specified points of interest are not frame accurate points of interest. In some embodiments, the random access points corresponding to operator-specified points of interest need to coincide with the operator-specified points of interest that are frame accurate points of interest.

If one or more random access points corresponding to operator-specified points of interest are not included in the pre-encodings, then the method continues to step 706, where the encoding application 146 modifies the media metrics based on heuristics for each random access point not included in the pre-encoded video sequences.

Subsequent to step 706, or if the encoding application 146 determines at step 704 that no random access points corresponding to operator-specified points of interest are not included in the pre-encodings, the method continues to step 708, where the encoding application 146 determines resolutions and encoding parameters for a bitrate ladder based on the modified media metrics, as described above in conjunction with FIG. 2.

At step 710, the encoding application 146 encodes the media content item at the resolutions and using the encoding parameters determined at step 708. In some embodiments, the encoding application 146 also packages the encoded media content items into various formats for distribution.

At step 712, the encoding application 146 deploys the encoded versions of the media content item when all encodings for the bitrate ladder are completed. The encoded versions of the media content item can be deployed in any technically feasible manner in some embodiments. For example, in some embodiments, the encoded versions of the media content item can be deployed to one or more servers, such as the servers of a content distribution network, that publish the encoded versions of the media content item for, e.g., streaming by client applications. At or around the same time, the client applications can be notified of the locations of the encoded versions of the media content item that are live. As described, deploying the encoded versions of the media content item when all encodings for the bitrate ladder are completed helps to ensure that client applications running on endpoint devices can switch between the encoded versions of the media content item, because the encoded versions will all include the same random access points that can be used to switch between the encoded versions. In some embodiments, encoded versions of a media content item are deployed when all encodings for the bitrate ladders across different encoding families, such as encodings using different codecs, are completed. Deploying the encoded versions of the media content item when all encodings for the bitrate ladders across different encoding families are completed permits client applications running on endpoint devices to switch between codecs without experiencing playback issues because segments and random access points will be aligned across all of the encodes.

In sum, techniques are disclosed for avoiding the re-encoding and re-packaging of media content items. In some embodiments, a video editing application receives, from an encoding application, a list of random access points of an encoded media content item associated with a media title. When an operator specifies a new point of interest for the media content item, the video editing application determines a closest random access point to the new point of interest and modifies the new point of interest to coincide with the closest random access point. The video editing application accepts an operator adjustment to the (modified) point of interest if the operator disagrees with the modified point of interest. Then, the video editing application transmits the modified or operator-adjusted point of interest to an encoding application. The encoding application determines whether the transmitted point of interest is a frame accurate point of interest. If the transmitted point of interest is a frame accurate point of interest, then the encoding application determines whether the frame accurate point of interest coincides with an existing random access point of the encoded media content item. If the frame accurate point of interest does not coincide with any existing random access point, then the encoding application adds the frame accurate point of interest to a set of points of interest to be fulfilled through re-encoding of the media content item. On the other hand, if the transmitted point of interest is not a frame accurate point of interest, the encoding application determines whether the transmitted point of interest is within a tolerance of an existing random access point. If the transmitted point of interest is within the tolerance of the existing random access point, then the encoding application modifies the transmitted point of interest to coincide with the existing random access point. If the transmitted point of interest is not within the tolerance of the existing random access point, then the encoding application adds the transmitted point of interest to the set of points of interest to be fulfilled through re-encoding of the media content item. The encoding application re-encodes the media content item to generate a re-encoded media content item that includes keyframes for the points of interest in the set of points of interest to be fulfilled through re-encoding of the media content, assuming that the points of interest are not already fulfilled in any previously encoded versions of the media content item. If re-encoding is not performed, metadata corresponding to the latest points of interest can be conveyed downstream so that client applications can use the points of interest to deliver corresponding features such as ad breaks, skipping an introduction, etc. The encoding application also modifies media metrics, computed using pre-encoded versions of the media content item, using heuristics to account for the transmitted points of interest that do not coincide with, or are not within a tolerance of (for points of interest that are not frame accurate), existing random access points. In addition, the encoding application deploys re-encoded versions of the media content item in an encoding ladder and/or across encoding families at the same time after re-encoded versions of the media content item have been generated.

At least one technical advantage of the disclosed techniques relative to the prior art is that the disclosed techniques avoid re-encoding and re-packaging media content items associated with media titles, as well as re-deploying the re-encoded and re-packaged media content items to a CDN, when operators add and/or change points of interest within those media content items. Accordingly, implementing the disclosed techniques saves the computational resources and time that would be required to perform the re-encoding and re-packaging. The disclosed techniques also save computation resources and time by modifying media metrics that are computed based on pre-encoded media content items, without having to re-encode those pre-encoded media content items. In addition, the disclosed techniques permit client applications running on endpoint devices to switch between re-encoded versions of a media content item in an encoding ladder by simultaneously publishing the re-encoded versions of the media content item. These technical advantages represent one or more technological improvements over prior art approaches.

1. In some embodiments, a computer-implemented method for avoiding re-encoding of video sequences comprises performing one or more encoding operations on a source video sequence to generate a first encoded video sequence that includes a first set of random access points, transmitting, to a video editing application, a list of the first set of random access points, and receiving, from the video editing application, one or more points of interest, wherein a first point of interest included in the one or more points of interest is modified by the video editing application to coincide with a first random access point included in the first set of random access points.

2. The computer-implemented method of clause 1, wherein the first set of random access points includes a plurality of random access points associated with a plurality of boundaries of one or more shots included in the source video sequence.

3. The computer-implemented method of clauses 1 or 2, wherein the first set of random access points includes one or more random access points associated with one or more segments of the source video sequence, and wherein each of the one or more segments has a predefined length.

4. The computer-implemented method of any of clauses 1-3, further comprising determining that a second point of interest included in the one or more points of interest is within a predefined tolerance of a second random access point included in the first set of random access points, and in response, modifying the second point of interest to coincide with the second random access point.

5. The computer-implemented method of any of clauses 1-4, further comprising modifying, based on the one or more points of interest, at least one of a size of or a quality score associated with at least one pre-encoded video sequence to generate at least one of a modified size or a modified quality score, selecting at least one of a resolution or an encoding parameter based on the at least one of the modified size or the modified quality score, and performing one or more encoding operations on the first encoded video sequence based on the at least one of the resolution or the encoding parameter to generate at least one additional encoded video sequence.

6. The computer-implemented method of any of clauses 1-5, further comprising, for each rung included in a plurality of rungs of an encoding ladder, performing one or more encoding operations on the first encoded video sequence based on the one or more points of interest, a respective resolution, and a respective set of encoding parameters to generate a respective encoded video sequence.

7. The computer-implemented method of any of clauses 1-6, wherein the first point of interest is closer to the first random access point than to any other random access point included in the first set of random access points.

8. The computer-implemented method of any of clauses 1-7, wherein the list of the first set of random access points indicates at least one of a set of frames of the source video sequence or a set of timestamps associated with the first set of random access points.

9. The computer-implemented method of any of clauses 1-8, further comprising performing one or more packaging operations based on the first encoded video sequence to generate a packaging for the first encoded video sequence.

10. The computer-implemented method of any of clauses 1-9, further comprising performing one or more encoding operations on the first encoded video sequence to generate a second encoded video sequence, wherein the second encoded video sequence comprises a second set of random access points, and the second set of random access points includes at least one random access point corresponding to at least one point of interest included in the one or more points of interest.

11. In some embodiments, one or more non-transitory computer-readable media store instructions that, when executed by at least one processor, cause the at least one processor to perform steps comprising performing one or more encoding operations on a source video sequence to generate a first encoded video sequence that includes a first set of random access points, transmitting, to a video editing application, a list of the first set of random access points, and receiving, from the video editing application, one or more points of interest, wherein a first point of interest included in the one or more points of interest is modified by the video editing application to coincide with a first random access point included in the first set of random access points.

12. The one or more non-transitory computer-readable media of clause 11, wherein the first set of random access points includes a plurality of random access points associated with a plurality of boundaries of one or more shots included in the source video sequence.

13. The one or more non-transitory computer-readable media of clauses 11 or 12, wherein the first set of random access points includes one or more random access points associated with one or more segments of the source video sequence, and wherein each of the one or more segments has a predefined length.

14. The one or more non-transitory computer-readable media of any of clauses 11-13, wherein the instructions, when executed by the at least one processor, further cause the at least one processor to perform the steps of determining that a second point of interest included in the one or more points of interest is within a predefined tolerance of a second random access point included in the first set of random access points, and in response, modifying the second point of interest to coincide with the second random access point.

15. The one or more non-transitory computer-readable media of any of clauses 11-14, wherein the instructions, when executed by the at least one processor, further cause the at least one processor to perform the steps of modifying, based on the one or more points of interest, at least one of a size of or a quality score associated with at least one pre-encoded video sequence to generate at least one of a modified size or a modified quality score, selecting at least one of a resolution or an encoding parameter based on the at least one of the modified size or the modified quality score, and performing one or more encoding operations on the first encoded video sequence based on the at least one of the resolution or the encoding parameter to generate at least one additional encoded video sequence.

16. The one or more non-transitory computer-readable media of any of clauses 11-15, wherein the instructions, when executed by the at least one processor, further cause the at least one processor to perform the step of, for each rung included in a plurality of rungs of an encoding ladder, performing one or more encoding operations on the first encoded video sequence based on the one or more points of interest, a respective resolution, and a respective set of encoding parameters to generate a respective encoded video sequence.

17. The one or more non-transitory computer-readable media of any of clauses 11-16, wherein the instructions, when executed by the at least one processor, further cause the at least one processor to perform the step of, for each rung included in a plurality of rungs of an encoding ladder, performing one or more encoding operations on the first encoded video sequence based on the one or more points of interest, a respective resolution, and a respective set of encoding parameters to generate a respective encoded video sequence.

18. The one or more non-transitory computer-readable media of any of clauses 11-17, wherein the first point of interest is closer to the first random access point than to any other random access point included in the first set of random access points.

19. The one or more non-transitory computer-readable media of any of clauses 11-18, wherein the instructions, when executed by the at least one processor, further cause the at least one processor to perform the step of performing one or more packaging operations based on the first encoded video sequence to generate a packaging for the first encoded video sequence.

20. In some embodiments, a system comprises a memory storing instructions, and a processor that is coupled to the memory and, when executing the instructions, is configured to perform the steps of performing one or more encoding operations on a source video sequence to generate an encoded video sequence that includes a set of random access points, transmitting, to a video editing application, a list of the set of random access points, and receiving, from the video editing application, one or more points of interest, wherein a first point of interest included in the one or more points of interest is modified by the video editing application to coincide with a first random access point included in the set of random access points.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for avoiding re-encoding of video sequences, the method comprising:
 performing one or more encoding operations on a source video sequence to generate a first encoded video sequence that includes a first set of random access points;
 transmitting, to a video editing application, a list of the first set of random access points; and
 receiving, from the video editing application, one or more points of interest, wherein a first point of interest included in the one or more points of interest is modified by the video editing application to coincide with a first random access point included in the first set of random access points.

2. The computer-implemented method of claim 1, wherein the first set of random access points includes a plurality of random access points associated with a plurality of boundaries of one or more shots included in the source video sequence.

3. The computer-implemented method of claim 1, wherein the first set of random access points includes one or more random access points associated with one or more segments of the source video sequence, and wherein each of the one or more segments has a predefined length.

4. The computer-implemented method of claim 1, further comprising:
 determining that a second point of interest included in the one or more points of interest is within a predefined tolerance of a second random access point included in the first set of random access points; and
 in response, modifying the second point of interest to coincide with the second random access point.

5. The computer-implemented method of claim 1, further comprising:
 modifying, based on the one or more points of interest, at least one of a size of or a quality score associated with at least one pre-encoded video sequence to generate at least one of a modified size or a modified quality score;
 selecting at least one of a resolution or an encoding parameter based on the at least one of the modified size or the modified quality score; and
 performing one or more encoding operations on the first encoded video sequence based on the at least one of the resolution or the encoding parameter to generate at least one additional encoded video sequence.

6. The computer-implemented method of claim 1, further comprising, for each rung included in a plurality of rungs of an encoding ladder, performing one or more encoding operations on the first encoded video sequence based on the one or more points of interest, a respective resolution, and a respective set of encoding parameters to generate a respective encoded video sequence.

7. The computer-implemented method of claim 1, wherein the first point of interest is closer to the first random access point than to any other random access point included in the first set of random access points.

8. The computer-implemented method of claim 1, wherein the list of the first set of random access points indicates at least one of a set of frames of the source video sequence or a set of timestamps associated with the first set of random access points.

9. The computer-implemented method of claim 1, further comprising performing one or more packaging operations based on the first encoded video sequence to generate a packaging for the first encoded video sequence.

10. The computer-implemented method of claim 1, further comprising performing one or more encoding operations on the first encoded video sequence to generate a second encoded video sequence, wherein the second encoded video sequence comprises a second set of random access points, and the second set of random access points includes at least one random access point corresponding to at least one point of interest included in the one or more points of interest.

11. One or more non-transitory computer-readable media storing instructions that, when executed by at least one processor, cause the at least one processor to perform steps comprising:
 performing one or more encoding operations on a source video sequence to generate a first encoded video sequence that includes a first set of random access points;
 transmitting, to a video editing application, a list of the first set of random access points; and
 receiving, from the video editing application, one or more points of interest, wherein a first point of interest included in the one or more points of interest is modified by the video editing application to coincide with a first random access point included in the first set of random access points.

12. The one or more non-transitory computer-readable media of claim 11, wherein the first set of random access points includes a plurality of random access points associated with a plurality of boundaries of one or more shots included in the source video sequence.

13. The one or more non-transitory computer-readable media of claim 11, wherein the first set of random access points includes one or more random access points associated with one or more segments of the source video sequence, and wherein each of the one or more segments has a predefined length.

14. The one or more non-transitory computer-readable media of claim 11, wherein the instructions, when executed by the at least one processor, further cause the at least one processor to perform the steps of:
 determining that a second point of interest included in the one or more points of interest is within a predefined tolerance of a second random access point included in the first set of random access points; and in response, modifying the second point of interest to coincide with the second random access point.

15. The one or more non-transitory computer-readable media of claim 11, wherein the instructions, when executed by the at least one processor, further cause the at least one processor to perform the steps of:

modifying, based on the one or more points of interest, at least one of a size of or a quality score associated with at least one pre-encoded video sequence to generate at least one of a modified size or a modified quality score;

selecting at least one of a resolution or an encoding parameter based on the at least one of the modified size or the modified quality score; and performing one or more encoding operations on the first encoded video sequence based on the at least one of the resolution or the encoding parameter to generate at least one additional encoded video sequence.

16. The one or more non-transitory computer-readable media of claim 11, wherein the instructions, when executed by the at least one processor, further cause the at least one processor to perform the step of, for each rung included in a plurality of rungs of an encoding ladder, performing one or more encoding operations on the first encoded video sequence based on the one or more points of interest, a respective resolution, and a respective set of encoding parameters to generate a respective encoded video sequence.

17. The one or more non-transitory computer-readable media of claim 11, wherein the instructions, when executed by the at least one processor, further cause the at least one processor to perform the step of, for each rung included in a plurality of rungs of an encoding ladder, performing one or more encoding operations on the first encoded video sequence based on the one or more points of interest, a respective resolution, and a respective set of encoding parameters to generate a respective encoded video sequence.

18. The one or more non-transitory computer-readable media of claim 11, wherein the first point of interest is closer to the first random access point than to any other random access point included in the first set of random access points.

19. The one or more non-transitory computer-readable media of claim 11, wherein the instructions, when executed by the at least one processor, further cause the at least one processor to perform the step of performing one or more packaging operations based on the first encoded video sequence to generate a packaging for the first encoded video sequence.

20. A system, comprising:
a memory storing instructions; and
a processor that is coupled to the memory and, when executing the instructions, is configured to perform the steps of:
performing one or more encoding operations on a source video sequence to generate an encoded video sequence that includes a set of random access points,
transmitting, to a video editing application, a list of the set of random access points, and
receiving, from the video editing application, one or more points of interest, wherein a first point of interest included in the one or more points of interest is modified by the video editing application to coincide with a first random access point included in the set of random access points.

* * * * *